United States Patent [19]
Neumaier

[11] Patent Number: 5,603,516
[45] Date of Patent: Feb. 18, 1997

[54] DRILLING AND/OR CHIPPING TOOL

[75] Inventor: Anton Neumaier, Fürstenfeldbruck, Germany

[73] Assignee: Hilti Aktiengesellschaft, Furstentum, Liechtenstein

[21] Appl. No.: 446,350

[22] Filed: May 22, 1995

[30]  Foreign Application Priority Data

May 24, 1994 [DE] Germany ................... 44 18 103.5

[51] Int. Cl.⁶ ........................................... B23B 31/107
[52] U.S. Cl. ...................... 279/19.5; 279/75; 279/905
[58] Field of Search .................... 279/19, 19.3–19.5, 279/71, 75, 904, 905

[56]  References Cited

U.S. PATENT DOCUMENTS

| | | | |
|---|---|---|---|
| 4,491,444 | 1/1985 | Rumpp et al. | 279/19.4 |
| 4,878,679 | 11/1989 | Plank et al. | 279/19.4 |
| 5,437,465 | 8/1995 | Vogele et al. | 279/905 |

FOREIGN PATENT DOCUMENTS

| | | |
|---|---|---|
| 298027 | 1/1989 | European Pat. Off. . |
| 3328886 | 2/1984 | Germany . |
| 3511491 | 10/1986 | Germany . |
| 9305463 | 8/1993 | Germany . |
| 4210911 | 10/1993 | Germany . |
| 2103988 | 3/1983 | United Kingdom . |

*Primary Examiner*—Steven C. Bishop
*Attorney, Agent, or Firm*—Anderson Kill & Olick P.C.

[57] ABSTRACT

A drilling and/or chipping tool has a locking sleeve (9) axially displaceable through a first axial length (A1) and a second axial length (A2). When the locking sleeve (9) is axially displaced through the first length (A1) a rotationally fixed connection between a tool bit holder (10) and a housing (1) of the tool is interrupted. If the locking sleeve is displaced by the second length (A2) the tool bit holder (10) can be removed from the tool.

10 Claims, 2 Drawing Sheets

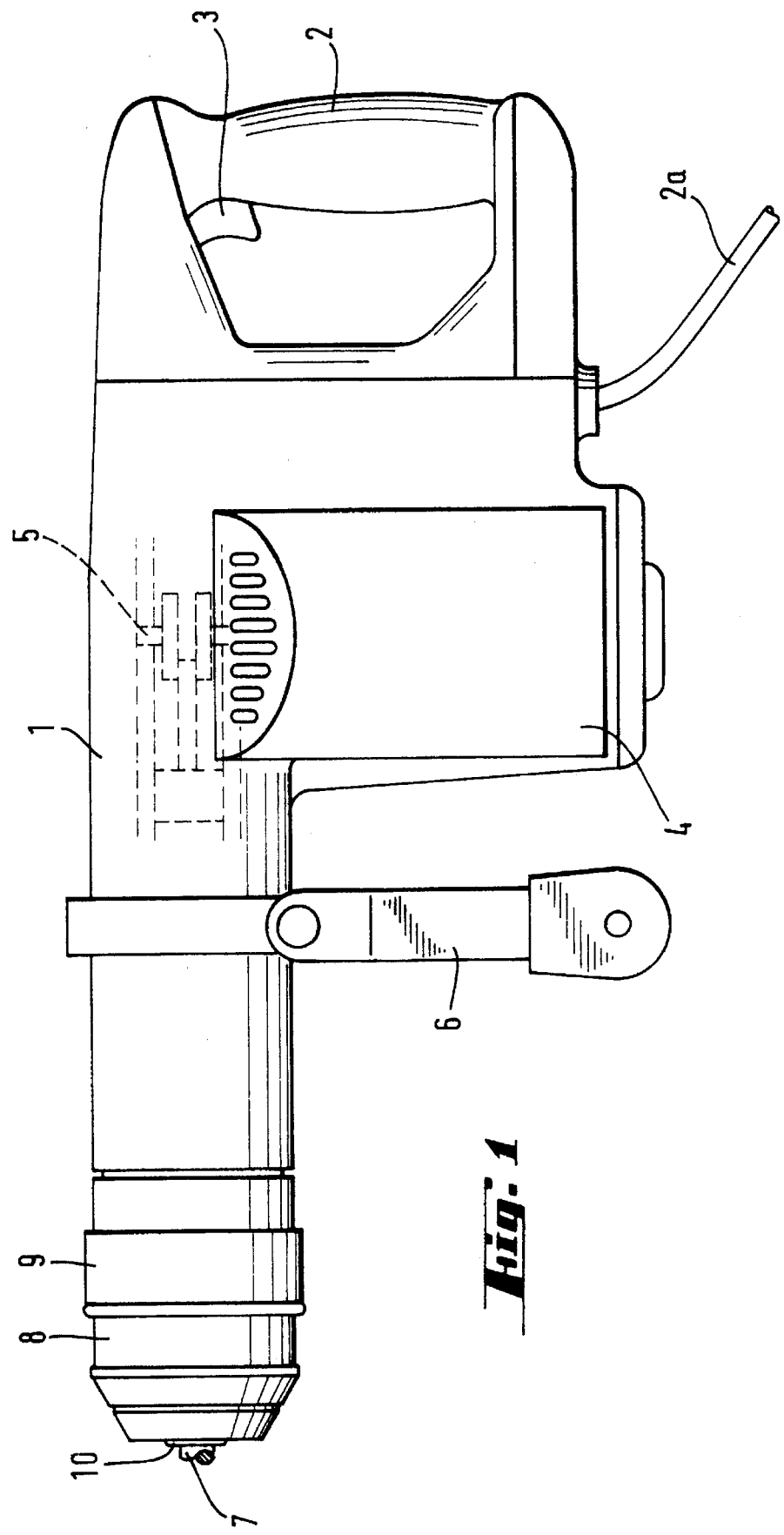

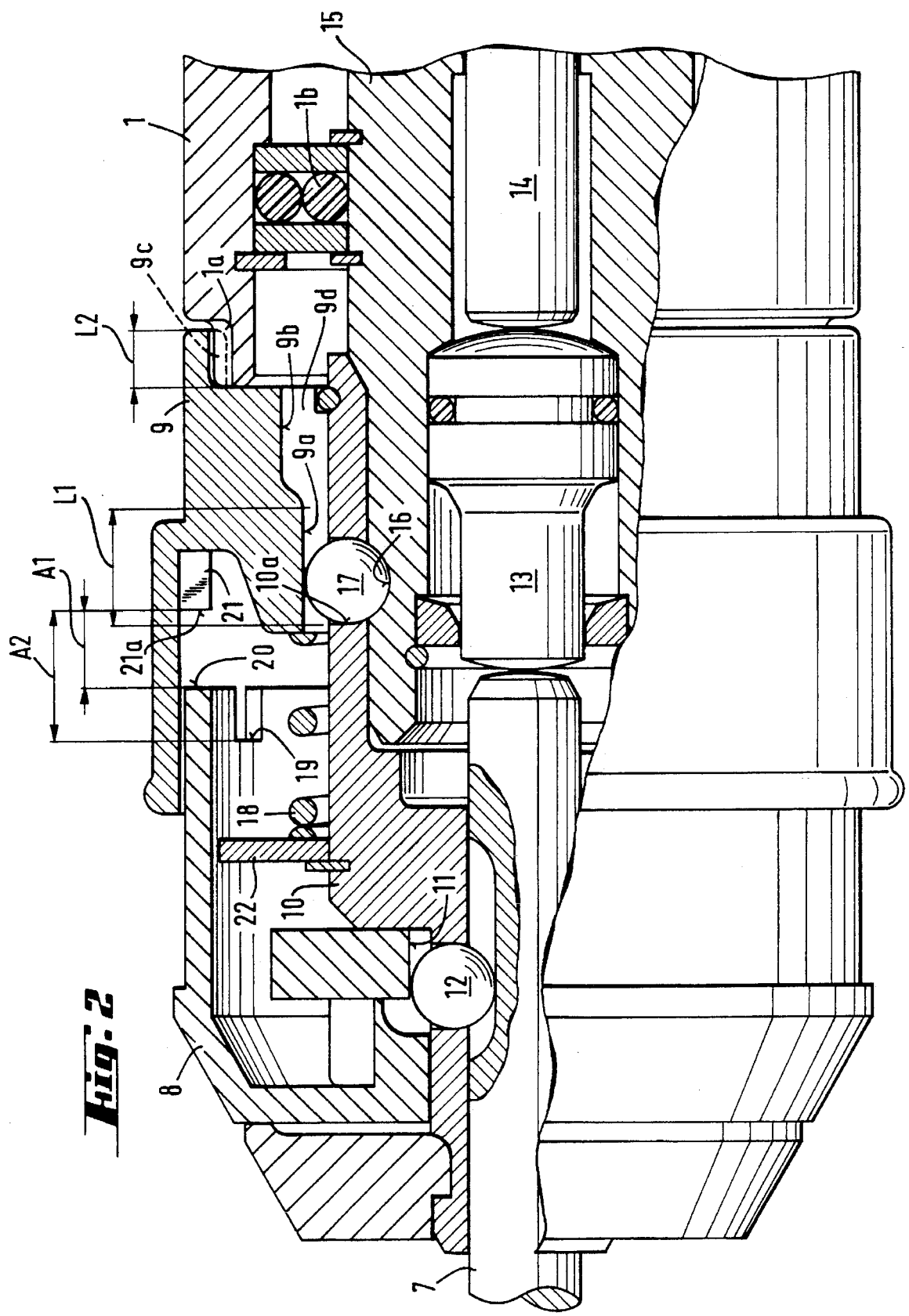

DRILLING AND/OR CHIPPING TOOL

BACKGROUND OF THE INVENTION

The present invention is directed to a drilling and/or chipping tool including a housing, a tool bit holder positioned at the front end of the housing, and a piston guide located within and extending out of the front end of the housing into the tool bit holder. A cap laterally encloses the tool bit holder and is at least partially rotatable relative to it. A locking sleeve is located at the front end of the housing and is axially displaceable against the biasing force of a spring. The piston guide and the tool bit holder are connected together by at least one radially displaceable locking element supported in a through opening in the tool bit holder. The locking element is engageable in at least one recess in the piston guide and the locking element can be radially displaced by axially displacing the locking sleeve.

A drilling and/or chipping tool of the above-mentioned type is disclosed in DE-PS 35 11 491. To enable the alignment of a tool bit inserted into the tool bit holder, the tool bit holder along with the drill bit must be turned in a circumferential direction relative to the piston guide. Turning the tool bit holder can be effected when the locking sleeve has been displaced. Locking elements supported in through openings of the tool bit holder can be shifted or displaced radially outwardly, whereby they no longer seat in the recesses of the piston guide. The tool operator must always take care, however, when axially displacing the locking sleeve, so that the tool bit holder is not pulled off the piston guide, when the locking elements no longer extend into the recesses of the piston guide.

SUMMARY OF THE INVENTION

Therefore, the primary object of the present invention is to provide a drilling and/or chipping tool where it is possible to turn or rotate the tool bit holder in the circumferential direction without simultaneously removing the tool bit holder from the piston guide.

In accordance with the present invention, the locking sleeve and the housing each has a set of teeth which can be placed in meshed engagement and the locking sleeve has at least one internal axially extending section of variable diameter.

The arrangement of the tool bit holder non-rotatable relative to the housing occurs by means of the axially displaceable locking sleeve which can be placed in engagement with the housing so that it cannot be rotated with respect to the housing.

Accordingly, the teeth on the housing are formed as external teeth extending in the axially direction of the locking sleeve and the teeth on the locking sleeve are formed as internal teeth also extending in the axially direction of the locking sleeve. The locking sleeve is held in a basic or initial position by a spring and in such position the locking sleeve is in engagement with a front end face of the housing. In this initial position, the two sets of teeth are in meshed engagement, so that a non-rotatable connection is formed between the locking sleeve and the housing. By axially displacing the locking sleeve in the striking direction of the tool against the force of the spring, the sets of teeth can be moved out of meshed engagement, whereby the locking sleeve along with the tool bit holder and the cap can be turned in the circumferential direction relative to the piston guide and the housing.

The inside surface of the locking sleeve facing the outside surface of the tool bit holder has at least one axially extending section of variable diameters for effecting radial displacement of a locking element guided in a through opening in the tool bit holder. The axially extending section in the interior of the locking sleeve forms an axially extending locking region and an axially extending unlocking region with the locking region having a smaller diameter than the unlocking region. If the locking region extends over or covers the through opening of the tool bit holder, the locking element is pressed radially inwardly into the recess in the outside surface of the piston guide. If the unlocking region covers the through opening of the tool bit holder, the locking element can move radially outwardly, so that the tool holder along with the locking sleeve can be removed from the piston guide.

Since the locked position of the tool bit holder relative to the piston guide by means of the locking element is effected when the locking sleeve is in the initial or basic position, appropriately the unlocking region is located closer to the housing. As a result, the unlocking region can be positioned covering the through opening of the tool bit holder only when the locking sleeve is displaced in the striking direction of the tool counter to the biasing force of the spring.

With the locking region covering the locking element, the non-rotatable connection between the locking sleeve and the housing can be disengaged, without the tool bit holder being removable from the piston guide. By cancelling the non-rotatable connection for aligning a tool bit inserted into the tool bit holder by axially displacement of the locking sleeve in the striking direction of the tool, the sets of teeth in the locking sleeve and the housing are no longer in meshed engagement, whereby the locking sleeve carrying the tool bit holder along with the piston guide can be turned in the circumferential direction until the desired alignment of the tool bit has occurred. Subsequently, if the axially displacement of the locking sleeve is released, then the two sets of teeth again mesh under the influence of the biasing force of the spring, which presses against the locking sleeve while axially abutting the tool bit holder. In this manner, the locking sleeve is again displaced into its initial position and the non-rotatable connection between the locking sleeve and the housing or between the locking sleeve and the tool bit holder is reestablished. Expediently, the axial length of the locking region is greater than the axial length of the meshed engagement of the locking sleeve and the housing.

Unintentional disengagement of the tool bit holder from the piston guide is prevented by limiting the axial displacement of the locking sleeve, preferably this is achieved by a first stop of a locking sleeve and a second stop on the cap where the maximum distance between these stops is larger than the axial length of the meshed engagement of the two sets of teeth on the locking sleeve and the housing and is smaller than the axial length of the locking region of the locking sleeve. Accordingly, the locking sleeve can be displaced only for a specific length, so that the sets of teeth can be moved out of meshed engagement without the unlocking region of the locking sleeve covering or registering with the through openings in the tool bit holder.

For reasons of cost and manufacturing, advantageously the first stop is formed by the edge of a tooth on the locking sleeve and the second stop is formed by the end face of the cap.

To assure removal of the tool bit holder from the piston guide, the locking sleeve must be axially displaced in the striking direction of the tool against the force of the spring, until the unlocking region of the locking sleeve registers with the through opening of the tool bit holder. The axial displaceability is appropriately limited by the first stop on the locking sleeve and a third stop on the cap, where the axial spacing between the first stop and the third stop is larger than the axial length of the locking region of the locking sleeve.

Preferably, as mentioned above, the first stop is formed by an edge of the tooth formed on the locking sleeve and the third stop is formed by the base of a slot extending axially from the rear end face of the cap. To afford this greater axially displacement of the locking sleeve, the cap must be turned in the circumferential direction relative to the locking sleeve until the first stop is aligned relative to the third stop. Appropriately, the cap is rotatable in the circumferential direction against the force of a spring element.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

In the drawing:

FIG. 1 is a side view of a drilling and/or chipping tool shown schematically and embodying the present invention; and FIG. 2 is an enlarged view, partly in section, of the front end region of the drilling and/or cutting tool illustrated in FIG. 1.

DETAILED DESCRIPTION OF THE INVENTION

In FIG. 1 a drilling and/or chipping tool is shown including an elongated housing 1 having a handle 2 at its rear end with an actuating trigger switch 3 positioned in the handle for operating the tool. At the lower end of the handle an electrical cable 2a provides current to a drive motor 4, not shown in detail, positioned in the housing adjacent the handle. Illustrated in phantom is a striking mechanism 5 located above the drive motor. A side handle 6 is mounted on and extends downwardly from the housing 1 at a position approximately midway between the rear end and front end of the housing. The front end is on the left in FIG. 1, the rear end on the right. At the front end of the housing there is a tool bit holder 10 into which a tool bit 7, shown only in part, is inserted. A cap 8 laterally encloses the tool bit holder 10 and a axially displaceable locking sleeve 9 is located towards the rear end relative to the cap. The axial direction or striking direction of the housing extends in the rear end-front end direction.

FIG. 2 displays an axially elongated piston guide 15 located inside the housing 1 and the guide abuts the housing by means of bearing elements 1b and projects in the axial direction partially beyond the front end of the housing 1. Within the piston guide 15 is an axially displaceable striker piston 13 to which percussive impulses are directed by an exciter piston 14 forming part of the striking mechanism 5.

The tool bit holder 10 of the drilling and/or chipping tool has a basically cylindrical receiving bore for holding and guiding the tool bit 7, shown only in part. The tool bit holder 15 has radially extending through openings and the through openings hold at least one radially displaceable locking element 12 in the form of a ball for locking the tool bit 7. A cap 8 laterally encloses the tool bit holder 10 and is partially rotatable in the circumferential direction relative to it against the force of a spring having a control curve section 11 at its inside surface, by means of which the locking element can be radially displaced if the cap 8 is rotated in a circumferential direction relative to the tool bit holder 10. In the tool bit locking position, the locking element 12 extends into an axially extending slot in the tool bit shank, which slot is closed at both ends spaced apart in the axial direction.

Towards the rear end of the tool bit holder 10 there is a radially extending through opening 10a for receiving and guiding a locking element 17 in the form of a ball. The tool bit holder 10 can be slid over the axially projecting region of the piston guide 15, so that the tool bit holder surrounds the projecting region of the piston guide with its rear end region adjacent the front end of the housing. Radial displacement of the ball-shaped locking element 17 is effected by means of an axially extending locking sleeve 9 axially displaceable against the biasing force of a spring 18. The locking sleeve 9 at least partially encloses the tool bit holder 10. The region of the piston guide 15 projecting from the front end of the housing 1 has a concave recess 16 at its outer surface for receiving the ball-shaped locking element 17. At the rear end region of locking sleeve 9 facing the front end of the housing 1 there is an internal set of teeth 9c extending in the axially direction of the locking sleeve.

Housing 1 has an external set of teeth 1a at its front end region located inwardly from the rear end of the locking sleeve.

Spring 18 presses the locking sleeve 9 into its initial position, as shown in FIG. 2, where the internal set of teeth 9c on the locking sleeve 9 are in meshed engagement with the external set of teeth 1a on the housing for a length L2. As a result, locking sleeve 9 is non-rotatably connected to the housing 1. Locking sleeve 9 has an axially extending interior section 9d of variable diameters for contacting the locking element 9. The section 9d has a axially extending locking subsection 9a and an axially extending unlocking subsection 9b. The locking subsection 9a has an axial length L1 longer than the axial length L2 of the meshed connection between the internal set of teeth 9c on the locking sleeve 9 and the external set of teeth 1a on the housing 1.

Tool bit holder 10 has a radially outwardly extending stop shoulder 22 for the front end of the spring 18 acting on the locking sleeve, the spring 18 is a helical compression spring. The locking sleeve 9 is axially displaceable in the striking direction for a length A1, until the first stop 21a on the locking sleeve bears against a second stop 20 formed by the rear end face of the cap 8. First stop 21a on the locking sleeve 9 is formed by a front edge of a tooth 21 formed on an inner surface of the locking sleeve.

The rear end face of the cap 8 directed towards the housing 1 has a third stop 19 formed by the base of an axially extending slot in the cap. By an appropriate turning of the cap 8 in the circumferential direction relative to the locking sleeve 9, the slot forming the third stop 19 can be aligned with the first stop 21a on the locking sleeve 9. As a result, locking sleeve 9 can be shifted through the overall length A2 so that the teeth in meshed engagement between the housing 1 and locking sleeve 9 are displaced out of engagement, and also permitting the locking element 17 of the tool bit holder 10 to move radially outwardly, whereby the rotationally and axially fixed connection between the tool bit holder 10 and the piston guide 15 is interrupted. Accordingly, the tool bit holder 10 can be removed from the piston guide 15 or respectively from the drilling and/or cutting tool.

While specific embodiments of the invention have been shown and described in detail to illustrate the inventive principles, it will be understood that the invention may be embodied otherwise without departing from such principles.

I claim:

1. A drilling and/or chipping tool comprising a housing (1) having a front end, a rear end and an axis extending in the front end-rear end direction, a tool bit holder (10) located at the front end of and extending in the axial direction of said housing, a piston guide (15) located in and extending in the axial direction of said housing and projecting from the front end of said housing into said tool bit holder, a cap (8) laterally enclosing said tool bit holder and at least partially rotatable relative to said tool bit holder, a locking sleeve (9) located at the front end of said housing and extending towards said cap and displaceable in the axial direction of said housing against a biasing force of a spring (18), a radially displaceable locking element (17) positioned in a through opening (10a) in said tool bit holder (10), said locking element being engageable in at least one recess (16) in said piston guide for connecting said piston guide and tool bit holder together, said locking element (17) is radially displaceable by axially displacing said locking sleeve (9), wherein the improvement comprises a first set of teeth on said locking sleeve (9) and a second set of teeth on said housing (1) with said first and second sets of teeth arranged to be placed in meshed engagement, and said sleeve has an axially extending interior section of variable diameters for contacting said locking element (17).

2. A drilling and/or chipping tool, as set forth in claim 1, wherein the first set of teeth (9a) on said locking sleeve (9) is arranged as an internal set of teeth extending in the axial direction and said second set of teeth (1a) on said housing (1) is arranged as an external set of teeth extending in the axial direction.

3. A drilling and/or chipping tool, as set forth in claim 1 or 2, wherein the axial extending section of variable diameter (9d) extending in the axial direction of said locking sleeve (9) comprises an axially extending locking subsection (9a) and an axially extending unlocking subsection (9b) wherein the locking subsection (9a) has a smaller diameter than the unlocking subsection (9d).

4. A drilling and/or chipping tool, as set forth in claim 3, wherein said unlocking subsection (9b) is closer to the front end of said housing (1) than said locking subsection (9a).

5. A drilling and/or chipping tool, as set forth in claim 4, wherein said locking subsection (9a) has an axial length (L1) greater than an axial length (L2) of the meshed connection of the first set of teeth (9a) on said locking sleeve (9) and the second set of teeth (1a) on said housing (1).

6. A drilling and/or chipping tool, as set forth in claim 5, wherein the axial displaceability of the said locking sleeve (9) is limited by a first stop (21a) on said locking sleeve (9) and a second stop (20) on a rear end of said cap (9), and the largest spacing (A1) between said first stop (21a) and said second stop (20) is greater than the axial length (L2) of the meshed engagement of said first and second sets of teeth on said locking sleeve (9) and said housing (1) and is smaller than the axial length (L1) of said locking subsection (9a) of said locking sleeve (9).

7. A drilling and/or chipping tool, as set forth in claim 6, wherein said first stop (21a) is formed by an edge of a tooth (21) located on said locking sleeve (9) and said second stop (20) is formed by a rear end face of said cap (9).

8. A drilling and/or chipping tool, as set forth in claim 7, wherein the total axial displaceability of the said locking sleeve (9) is limited by said first stop (21a) on said locking sleeve (9) and by a third stop (19) on said cap (8), and the greatest distance (A2) between the first stop (21a) and the third stop (19) is greater than the axial length (L1) of the Locking subsection (9a) of said locking sleeve (9).

9. A drilling and/or chipping tool, as set forth in claim 8, wherein said third stop (19) is formed by a base of an axially extending slot in said cap (8) extending axially from the rear end of said cap.

10. A drilling and/or chipping tool, as set forth in claim 9, wherein said cap (8) is rotatable in the circumferential direction against a force of a spring element.

* * * * *